Patented Feb. 23, 1943

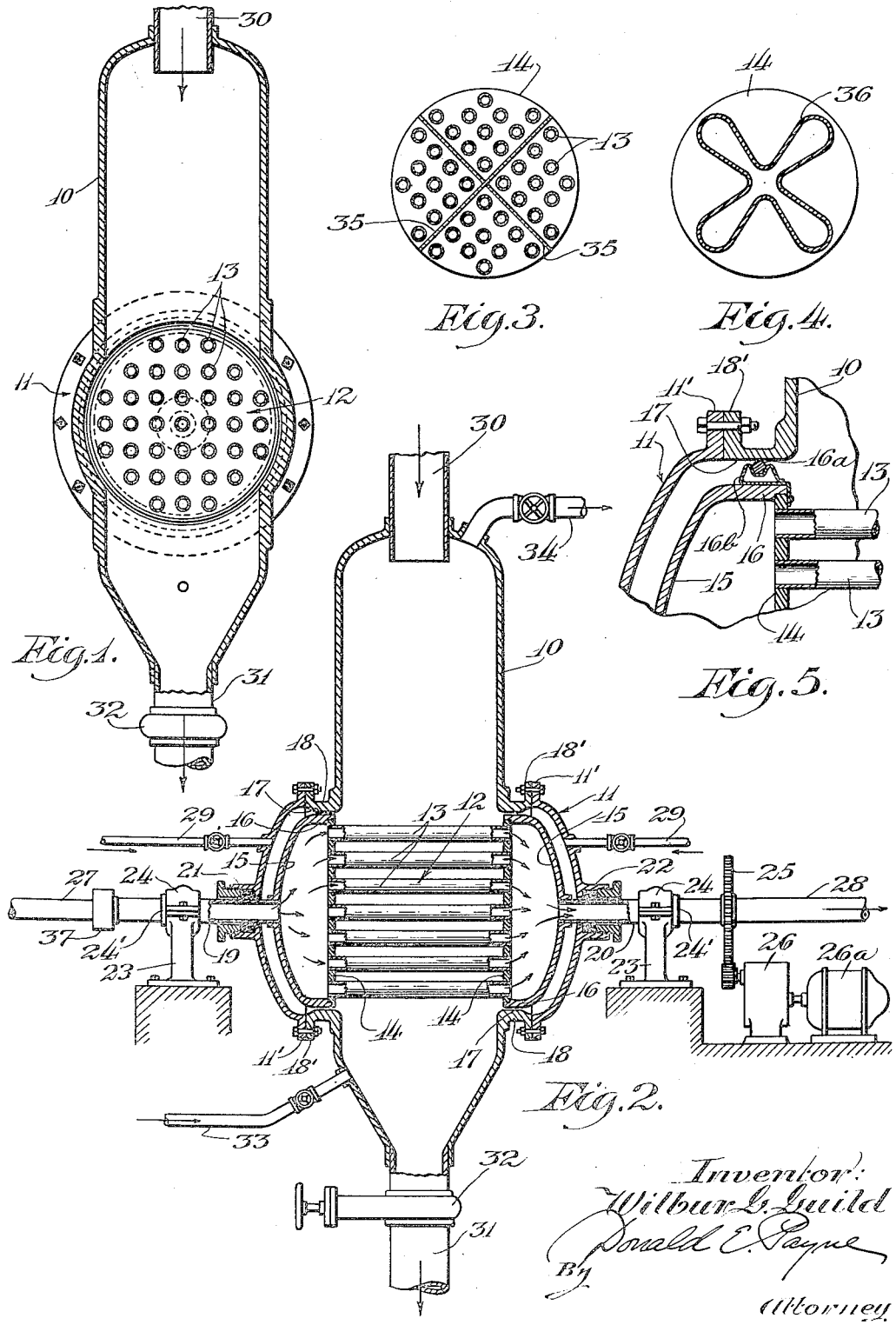

2,311,984

UNITED STATES PATENT OFFICE 2,311,984

CONTINUOUS ROTARY HEAT EXCHANGER FOR CATALYST SYSTEMS

Wilbur G. Guild, Chicago, Ill., assignor to Standard Oil Company, Chicago, Ill., a corporation of Indiana Application December 5, 1940, Serial No. 368,680

4 Claims. (Cl. 23—288)

This invention relates to a continuous rotary heat exchanger for catalyst systems and it pertains more particularly to an improved means for preheating solid catalyst particles before charging the catalyst to a reaction zone, for adding heat in an endothermic reaction or extracting heat in an exothermic reaction or for cooling hot catalyst discharged from a hot reaction zone.

Heat exchangers designed for fluids such as gases and liquids offer certain disadvantages when used for handling solids. The flow characteristics of granular, pelleted or powdered solids are very different than the flow characteristics of fluids, particularly because of the tendency of the solids to come to rest on any exposed horizontal or slightly inclined surface and because of the tendency of solids to bridge and flow unevenly. Intimate contact between flowing solids and heating surfaces is more difficult to obtain than intimate contact in the case of liquids because the latter exhibit a turbulence not exhibited by flowing solids. An object of this invention is to provide a heat exchanger for a stream of granular, pelleted or powdered solids, particularly for solid catalyst particles.

In endothermic reactions such as catalytic cracking, it is desirable to add heat to solid catalyst particles in the reaction zone. In exothermic reactions, such as the burning of carbonaceous material from solid catalyst, it is desirable to remove heat from the combustion zone because unduly high temperatures may destroy catalyst activity. When a reaction is effected at high temperatures by injecting catalyst into a vapor or liquid stream, it is desirable to have the injected catalyst at at least as high a temperature as the stream into which it is introduced and a preheating of the solid catalyst may thus be necessary. On the other hand, it may be desirable to recover heat from regenerated catalyst before the catalyst is returned to the system for further conversion. An object of my invention is to provide a heat exchanger which will accomplish all of these desired results.

When carbonaceous material is burned from a mass of granular or pelleted catalyst material there is a tendency for a "hot spot" to develop which may ruin the activity of a considerable portion of the catalyst even though the remainder of the catalyst does not exceed safe temperatures. An object of my invention is to provide a system wherein catalyst may be simultaneously agitated and cooled during the regeneration step so that there will be no possibility of development of hot spots and so that temperatures may be maintained within uniform and closely defined limits throughout the entire regeneration zone. Other objects will become apparent as the detailed description of the invention proceeds.

In practicing my invention I provide a reaction chamber, regeneration chamber, catalyst inlet conduit or catalyst outlet conduit with a continuously rotating tubular heat exchanger. As the catalyst flows vertically through the exchanger it impinges against substantially horizontal tubes containing a heat exchange fluid which may be steam, a gas, an oil, a fused salt, a molten metal, or any other heat exchange fluid known to the art. If these horizontal tubes were stationary the catalyst would build up on each tube and would bridge between tubes. I avoid these difficulties and at the same time obtain uniform and intimate contact throughout the heat exchange zone by slowly rotating the tubular section of the exchanger about a substantially horizontal axis. The rotation of the bundle of tubes prevents any solids from accumulating on tube surfaces, provides a thorough and intimate mixing throughout the zone so that there will be no tendency for the development of hot spots and it prevents any tendency to bridge by positively maintaining the solids in fluent or flowable form.

In certain types of reactors and regenerators an up-flow system is used, the catalyst being introduced at the base of a vertical reactor with incoming gases or vapors and being maintained as a dense phase in the base of the reactor by using vapor velocities usually of about 1½ or 2 feet per second. In such systems it is desirable to maintain the catalyst in the reactor for a considerably longer period of time than the vapors are maintained therein. However, there is a tendency toward channelling in such reactors and for certain of the catalyst particles to pass through the reactor with the vapor before they have been in the reactor for the desired "catalyst residence time." My improved heat exchanger not only provides a means for adding and abstracting heat in up-flow reactors, but it prevents channelling and insures a much more uniform reaction or regeneration than has heretofore been possible.

The invention will be more clearly understood from the following detailed description and from the accompanying drawing which forms a part of the specification and in which Figure 1 is a vertical section through the exchanger transverse to the axis of rotation, Figure 2 is a vertical section through the axis of rotation of the heat exchange tube bundle, Figure 3 is a section of a combination heat exchanger and feeder, Figure 4 is a section of another combination heat exchanger and feeder and Figure 5 is a detail section showing an improved seal ring structure.

Referring to Figure 1, a conduit or reaction chamber 10, which may be of either circular or rectangular or other desirable cross-sectional shape, is provided with large base portion 11 designed to receive a cylindrical bundle of heat exchange tubes 12. The individual tubes 13 are welded, rolled or otherwise secured into circular tube sheets 14 and these tube sheets are secured at their periphery to a dome shaped cover 15. This dome shaped cover terminates in a cylindrical skirt 16 the outer surface of which is machined to fit a circular machined surface 17 in the outwardly extending circular flange 18 which is integral with or suitably connected to enlarged section 11. To provide for insertion and removal of the tube bundle, flanges 18' and 11' may be used on one or both sides of chamber 10. A tight fit between skirt 16 and surface 17 may not be practical in large installations and it is therefore highly advisable to use a seal ring as illustrated in Figure 5. Instead of having skirt 16 bear directly against surface 17, a seal ring 16A may be secured to skirt 16 by a flexible retaining sheet 16B.

The centers of the dome shaped covers 15 terminate in hollow shafts or trunnions 19 and 20 which support the bundle of tubes and which serve for the introduction and the withdrawal of fluids. These trunnions extend through suitable stuffing boxes 21 and 22 in the enlarged chamber walls. In small installations the trunnions may be carried by the chamber wall itself but I prefer to provide external supports 23 and bearings 24 therefor. One or both of the trunnions is provided with suitable gear wheel 25 or other connection adapted to be driven through reduction gears in box 26 by motor 26a. The inside of trunnion 19 is connected by rotary joint 27 to conduit 27 and similarly a conduit 28 leads to the inside of trunnion 20, suitable stuffing boxes being employed for preventing any leakage of the heat exchange fluid. Thrust bearings 24' may be employed on the trunnions adjacent bearings 24 for centering the tube bundle in the vessel or reactor 10.

Sufficient space is provided between the drum shaped covers 15 and enlarged chamber walls 11 to provide for expansion when heating fluid is passed through the tubes and to permit the tube bundle to be rotated about its horizontal axis. Since there must necessarily be some clearance between the outer surface on skirt 16 and the inner surface 17 on flange 18, provision may be made for keeping abrasive solids out of this clearance space. I may introduce an inert gas such as steam through line 29 into the space between dome shaped cover 15 and chamber wall 11 and I may maintain sufficient positive pressure within said space to keep the bearing surfaces free from entering solids. This expedient may be advisable even with the seal ring structure shown in Figure 5.

Solid catalyst particles may be introduced through line 30 and withdrawn through line 31 which may be provided with a suitable slide valve 32. As the solid catalyst particles fall downwardly into the enlarged portion of the chamber the tube bundle in said chamber is slowly rotated so that the solids which tend to pile up on the tubes are constantly displaced therefrom. The falling catalyst impinges not only against the top of each tube, but during the rotation of the tube bundle all surfaces of the tubes become a target for catalyst impact. The revolving tubes in the rotating tube bundle cause a thorough mixing of the solid catalyst particles which prevents any tendency to bridge and insures a fluent mass of solids for discharge through line 31. The rate of rotation of the tube bundle is preferably relatively slow, for example, about $\frac{1}{10}$ to 10 revolutions per minute. This very slow stirring action which is effected by the tube bundle does not cause undue abrasion or disintegration of the catalyst particles but simply causes a gentle and efficient mixing thereof while simultaneously bringing each catalyst particle into intimate contact with heat exchange surfaces.

For hydrocarbon conversion processes, such as catalytic cracking, the catalyst may be a silica gel containing alumina or both alumina and zirconia deposited thereon. No novelty is claimed in any catalyst per se and it should be understood that any type of solid catalyst may be used in my improved heat exchanger.

If the reaction is to be effected at a temperature of about 850 to 1050 F., my heat exchanger may be used to preheat the catalyst to this temperature before admixing it with the heated charging stock. Thus the fresh or regenerated catalyst may be introduced through line 30 and a hot fused salt mixture, molten metal or the like may be introduced through line 27, passed through the tube bundle and withdrawn through line 28 at a temperature of about 900 to 1100° F. The preheated catalyst may be discharged through line 31 directly into the oil stream or into a catalytic conversion zone.

In catalytic cracking processes and the like the catalyst becomes coated with a carbonaceous deposit and this deposit is subsequently burned from the catalyst in a regeneration zone. In the regeneration zone the temperature may be higher than the desired temperature for the conversion zone and it may, therefore, be desirable to cool the regenerated catalyst before returning it to the conversion zone. In this case the hot regenerated catalyst is introduced through line 30 and a cooling fluid which may be fused salt or steam or any other stable fluid may be introduced through line 27, passed through the tube bundle and withdrawn through line 28 for abstracting the desired amount of heat from the regenerated catalyst as it flows through the exchanger.

Either the on-stream or the regeneration reaction may be effected in the heat exchanger itself. In this case the hot hydrocarbon vapor may be introduced into the exchanger through line 30 together with the catalyst or the hot hydrocarbon gases may be introduced through line 33 and the reaction products withdrawn through line 34. The temperature throughout the reaction zone may be maintained within very closely defined limits by supplying the heat of cracking at the rate required to effect that cracking.

In up-flow reactions or regenerations the catalyst may be introduced with a gaseous stream through line 31 and withdrawn through line 30. With properly controlled vapor velocities a dense liquid-like phase of suspended catalyst may be maintained in the heat exchanger zone, and "short circuiting" or channelling is prevented in this zone by the rotation of the tube bundle.

The use of my heat exchanger for catalyst regeneration is perhaps even more important than its use in on-stream reactions because accurate temperature control in regeneration has heretofore been very difficult to obtain. However, by introducing air through line 33 and withdrawing combustion products through line 34 and by simultaneously passing a cooling fluid through the tube bundle while rotating said tube bundle to effect intimate contact of the tubes with all particles of catalyst and to prevent the development of hot spots, I can effect regeneration without exceeding safe temperature limits.

It should be understood that reactions in my heat exchanger may be employed either batchwise or continuously and that in continuous operations a plurality of the heat exchangers may be utilized in series. In powdered catalyst systems wherein catalyst is pneumatically conveyed, the conveying gas may be introduced with the catalyst through line 30 and the velocity of the stream may be sufficiently retarded on its entry into chamber 10 that the catalyst will rain down through the heat exchanger and then be withdrawn from the heat exchanger by the gas in which it was introduced. Where powdered catalyst is pressured in a standpipe, my heat exchanger may be employed at the base of the standpipe to preheat the catalyst and to increase its fluidity immediately before it is injected into a hydrocarbon stream. In fact, a single tube between the tube sheets may be so shaped as to provide a star feeder for simultaneously heating the catalyst and positively discharging it from the standpipe or holder.

Thus solid plates 35 may be affixed between tube sheets to form a star feeder as illustrated in Figure 3 or a star shaped star feeder 36 may be inserted between the tube sheets with heat exchange liquid flowing therethrough as illustrated in Figure 4.

While I have disclosed a preferred embodiment of my invention it should be understood that I do not limit myself to the mechanical details hereinabove set forth since obvious modifications and equivalents will be apparent to those skilled in the art from the above description.

I claim:

1. In apparatus for controlling the temperature of granular, pelleted or powdered solids, a tall substantially vertical chamber, means for introducing solids at one end of said chamber and for removing solids from the other end thereof, a substantially horizontal tube bundle rotatably mounted in said chamber, and positioned in said chamber to provide a relatively large space in said chamber above the rotatable tube bundle and a relatively small space below said tube bundle, means for introducing a gas or vapor into said chamber below said tube bundle, means for withdrawing a gas or vapor from the upper part of said chamber above said tube bundle, means for passing a heat exchange fluid through the tubes of said tube bundle and means for rotating said tube bundle.

2. In apparatus for controlling the temperature of granular, pelleted or powdered catalyst solids, a tall substantially vertical chamber, a substantially horizontally disposed rotatable tube bundle mounted in the chamber at a sufficiently low level to leave a relatively large space in the chamber above the rotatable tube bundle and a relatively small space in said chamber below said tube bundle, means for passing heat exchange fluid through the tubes of said tube bundle, means for rotating said tube bundle around a substantially horizontal axis, a large conduit communicating with said chamber at a point above said tube bundle, a large conduit communicating with said chamber at a point below said tube bundle, separate means for introducing a gas or vapor into said chamber at a point below said tube bundle and means for withdrawing a gas or vapor from said chamber at a point above said tube bundle.

3. In apparatus for controlling the temperature of granular, pelleted or powdered solids, a tall substantially vertical chamber, a large conduit communicating with the bottom of said chamber and a separate conduit having an inwardly extending end communicating with the space in the upper part of the chamber, a substantially horizontal tube bundle rotatably mounted in said chamber above said first-named conduit but substantially below the top of the chamber whereby there is a relatively large space in said chamber above the rotatable tube bundle, separate means for introducing a gas or vapor into said chamber below said tube bundle and means for withdrawing a gas or vapor from the upper part of said chamber, means for passing a heat exchange fluid through the tubes of said tube bundle, and means for rotating said tube bundle.

4. In apparatus for controlling the temperature of granular, pelleted or powdered solids, a tall substantialy vertical chamber, a substantially horizontally disposed rotatable tube bundle mounted in said chamber at a sufficiently low level to provide a relatively large space in said chamber above the rotatable tube bundle and a relatively small space in said chamber below the rotatable tube bundle, means for passing heat exchange fluid through the tube of said tube bundle, means for rotating said tube bundle around a substantially horizontal axis, means for introducing powdered solids into said chamber, separate means for withdrawing powdered solids from said chamber, separate means for introducing a gas or vapor into said chamber at a point below said tube bundle and separate means for withdrawing a gas or vapor from the upper part of said chamber at a point substantially above said tube bundle.

WILBUR G. GUILD.